May 28, 1968  G. K. NEWELL  3,385,562

ANGLE COCK

Filed Dec. 27, 1965

INVENTOR.
George K. Newell
BY Donald P. Rooney
Agent

United States Patent Office 3,385,562
Patented May 28, 1968

3,385,562
ANGLE COCK
George K. Newell, Penn Township, Westmoreland County, Pa., assignor to Westinghouse Air Brake Company, Wilmerding, Pa., a corporation of Pennsylvania
Filed Dec. 27, 1965, Ser. No. 516,587
4 Claims. (Cl. 251—298)

ABSTRACT OF THE DISCLOSURE

A valve device of the type commonly referred to as disc valves comprising a valve body having a throughbore that is adapted to be closed off by a disc that is universally rockable on a pivot pin fitted adjacent the disc and within the throughbore. The disc and its stem are controlled by a conventional external handle connected to the stem. The handle is mounted in a bore located intermediate the ends at said throughbore.

According to the existing well-known construction of angle and cutout cocks, the valve member is customarily made as a tapered cylindrical valve member seated on a correspondingly tapered seat in the cock body to which it is lapped or ground and has an aperture therethrough which is aligned with or transversed to the flow passage through the cock as valve members turn to control flow of fluid through the cock device. This type of angle or cutout cock device is reliable and has a satisfactory service life.

It has more recently been proposed to provide a new design of angle or cutout cocks employing a disc valve that can be utilized for example in the brake pipe system for railway cars and trains, which design is relatively simple in construction and low in cost. An example of this later type angle cock is illustrated and described in copending U.S. patent application No. 443,846 assigned to the same assignee as is the present invention.

It is an object of the present invention to provide a new design of the disc valve type of angle or cutout cocks which utilizes a novel arrangement for mounting and actuating the valve element and which further enables inexpensive servicing in the field by relatively unskilled workmen.

According to the invention, there is provided an angle or cutout cock having a sectionalized cock body in which a disc valve element is mounted for controlling flow of fluid through the flow passage of the cock. The disc valve element is supported at the center thereof for universal rockable movement on the end of a mounting pin fixed in the cock body. A rotary valve stem effects rocking movement of the disc valve element between closed and open positions through the medium of a tubular connecting stem which has one end fitted into a recess eccentric to the axis of rotation of the valve stem and the other end telescopically fitted over a central projecting finger on the disc valve element.

Figure 1:
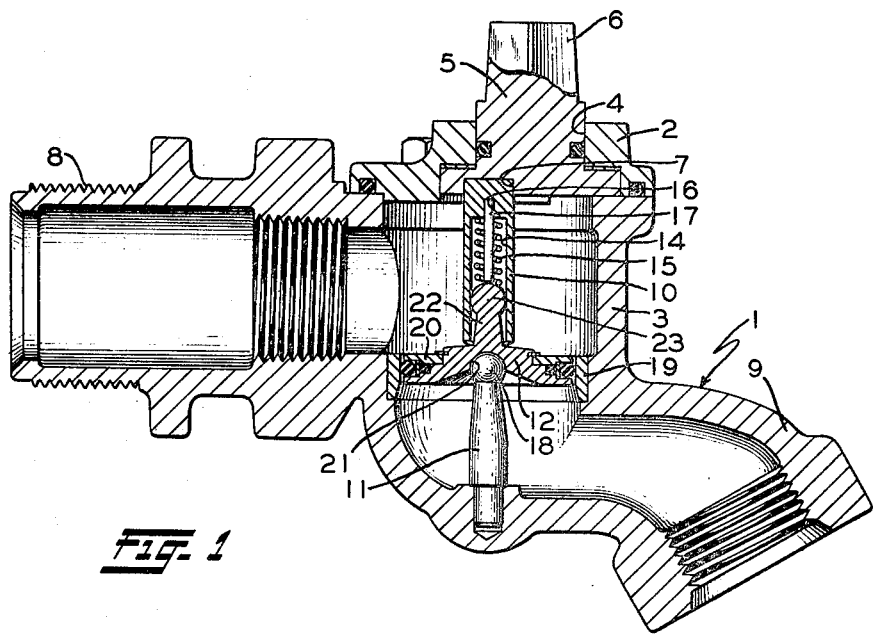
Figure 2:
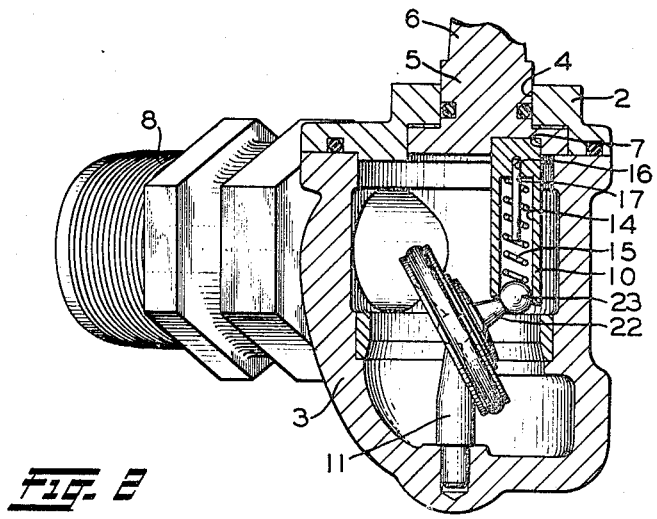

In the accompanying drawings FIG. 1 is a longitudinal cross-sectional view showing the valve member in fully closed position, and FIG. 2 is a cross-sectional view with the cock slightly turned from the position of FIG. 1 and showing the valve member in full-open position.

Referring now to the drawings, the valve device shown in the figures comprises a sectionalized cock body 1 having two separate sections 2 and 3 secured together in sealed relation as by bolts, with a conventional O-ring seal between the sections.

Section 2 of the cock body has a bore 4 therein and mounted in the bore is a boss 5 the outer end of which forms a valve handle receiving member 6 and the inner end of which has a bore 7 therein situated eccentrically of and parallel to the center line of the said boss about halfway between the center line and the outer periphery of the said boss.

Section 3 includes an externally threaded extension 8 having a main flow passage therein adapted for connection to the end of the brake pipe of a railroad car. Section 3 also includes, at the other end thereof, an internally threaded extension 9 adapted for connection to a hose and coupling assembly of a railroad car.

Rotatably fitted between sections 2 and 3 is the valve assembly. The valve assembly comprises an operating stem 10 fitted in bore 7 in valve section 2 and a mounting pin 11 fixedly fitted in a bore in valve section 3 as by a press fit. The valve assembly also comprises a disc valve 12, fitted between the valve stem 10 and the mounting pin 11, to be later fully described in detail. The stem 10 further includes a bore 14 having therein a coil spring 15. Also the bore has a counterbore 16 with a stop pin 17 fitted therein concentric with and internal of said coil spring. The mounting pin 11 further includes a tapered shaft and a ball 18 at the top end of the tapered section. The disc valve 12 is fitted between the operating stem 10 and the ball 18 and is concentric to and internal of the bushing 19 which is fitted in section 3 of the cock body 1. The disc valve is made of two sections with a double O-ring grommet between them, which grommet, per se, has been previously disclosed in the aforesaid U.S. application Ser. No. 443,846. One section of the disc valve 12 is washer 20, the other section comprises a first face that is concave with a ball socket 21 in the center of the concave depression and said ball socket receives and rotates about ball 18 of the stem section 11. The other face of the disc has a centrally located perpendicular stem or shaft 22 thereon which has a ball 23 at the small end thereof. Both the shaft and its ball 23 fit into the bore 14 of the stem 10 where the ball contacts the spring 15 and the stop 17. In turn, the upper end of stem 10 is fitted tightly into the cylindrical bore 7 in the bottom part of the boss 5.

Operation

When the valve handle receiving member 6, which is the external extension of boss 5, is rotated about the center line of boss 5, the stem 10 is correspondingly rotated through an arc about the axis of rotation of the boss 5. As boss 5 rotates, the disc valve 12 will nutate or rock on the ball 18 of mounting pin 11, thus disc valve 12 will be pivoted within bushing 19, while maintaining diametral contact therewith, to an open position, as can be viewed in FIG. 2 of the drawings. When the valve is to be closed, the valve hande receiving member 6 is rotated in the opposite direction through an angle of about 90° and the stem 10 again rotates back about the axis of rotation of the boss 5 carrying with it the tapered shaft 22 and ball 23 of the disc valve 12, thus again nutating or rocking the disc valve 12 about ball 18 of the static mounting pin 11. As the disc valve 12 is closed, the tapered shaft 22 and ball 23 which reciprocate inside bore 14 of stem 10, overcome the tension of spring 15 and are stopped against the stop pin 17; thus the 90° rotation is completed and the double O-ring grommet of the disc valve 12 is completely internal of and tightly and sealingly compressed against bushing 19 in closed position.

Although a specific embodiment of the invention has been shown and described, it is with full awareness that other modifications thereof are possible within the terms of the appended claims.

Having now described the invention, what I claim as new and desire to secure by Letters Patent is:

1. A valve device comprising:

(a) a valve body having a passage therein and a bore intermediate the ends of said passage,
(b) disc valve means,
(c) pivot means including two ends, one of said two ends being fitted in said body and the other of said two ends extending into and terminating in said passage, and said other of said two ends being rockably associated with the center of said disc valve means,
(d) means by which said disc valve is mounted on the end of said pivot means for universal rocking movement, said disc valve means having a position substantially diametral to the said bore in which it closes the bore and being rockable out of said position to open the bore, and
(e) operating means for effecting the rocking movement of said disc valve means.

2. The valve device of claim 1, wherein said operating means includes:
(a) a valve stem which is eccentric to and parallel with the center line of rotation of said operating means, and
(b) a projecting stem on said disc valve with which said valve stem cooperates.

3. The valve device of claim 1, wherein said pivot means comprises a shaft statically fixed at one end in said valve body and having a ball on the opposite end, and wherein said disc valve has a central spherical socket in which said ball is received.

4. The valve means of claim 2 wherein said valve stem has a bore therein which contains a concentric coil spring and stop pin and in which said projecting stem on the disc valve moves reciprocatingly as the valve stem is rotated.

References Cited
UNITED STATES PATENTS

| | | | |
|---|---|---|---|
| 144,996 | 11/1873 | Marriott | 251—228 |
| 820,846 | 5/1906 | Bate | 251—248 X |
| 1,681,966 | 8/1928 | Zeidler | 251—303 X |
| 2,355,017 | 8/1944 | Stone | 251—308 |
| 3,089,505 | 5/1963 | Forster | 251—248 X |
| 3,159,376 | 12/1964 | Ray | 251—175 X |
| 3,232,310 | 2/1966 | Treder | 251—308 X |

M. CARY NELSON, *Primary Examiner.*

R. C. MILLER, *Assistant Examiner.*